(12) United States Patent
LaVigne et al.

(10) Patent No.: US 7,292,573 B2
(45) Date of Patent: Nov. 6, 2007

(54) METHODS AND APPARATUS FOR SELECTION OF MIRRORED TRAFFIC

(75) Inventors: Bruce Edward LaVigne, Roseville, CA (US); Paul T. Congdon, Granite Bay, CA (US); Mark Gooch, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 828 days.

(21) Appl. No.: 10/813,766

(22) Filed: Mar. 31, 2004

(65) Prior Publication Data

US 2005/0220092 A1    Oct. 6, 2005

(51) Int. Cl.
*H04L 12/28* (2006.01)

(52) U.S. Cl. .................. 370/390; 370/468; 370/394; 370/401; 370/432

(58) Field of Classification Search ............... None
See application file for complete search history.

(56) References Cited

U.S. PATENT DOCUMENTS

| | | | |
|---|---|---|---|
| 5,802,320 A | 9/1998 | Baehr et al. | |
| 6,041,042 A | 3/2000 | Bussierre | |
| 6,618,818 B1 | 9/2003 | Wahl et al. | |
| 6,707,817 B1* | 3/2004 | Kadambi et al. | 370/390 |
| 7,031,304 B1* | 4/2006 | Arberg et al. | 370/360 |
| 2004/0213232 A1* | 10/2004 | Regan | 370/390 |

\* cited by examiner

*Primary Examiner*—Duc Ho

(57) ABSTRACT

One embodiment disclosed relates to a method for mirroring of select network traffic. A data packet is received by a network device. A determination is made as to whether a designated aspect of the packet matches a flagged entry in a look-up table on the network device. If a match is found, then copy of the packet is sent to an associated mirror destination. Another embodiment disclosed relates to a networking apparatus. The apparatus includes at least an operating system, a look-up table, and a mirroring engine. The operating system includes routines utilized to control the apparatus, and the look-up table includes selection information for mirror sources. The mirroring engine forwards copies of selected packets to a corresponding mirror destination. Another embodiment disclosed relates to a method of selecting packets to mirror that includes checking state information relating to the network traffic against dynamic mirroring criteria.

35 Claims, 15 Drawing Sheets

| MAC Source Address (SA) 202 | MAC Destination Address (DA) 204 | Ingress Mirroring Bit 206 | Egress Mirroring Bit 208 | Other Fields and/or Flags 210 |
|---|---|---|---|---|
| | | | | |
| | | | | |
| | | | | |
| | | | | |

| IP Source Address (SA) 402 | IP Destination Address (DA) 404 | Ingress Mirroring Bit 406 | Egress Mirroring Bit 408 | Other Fields and/or Flags 410 |
|---|---|---|---|---|
| | | | | |
| | | | | |
| | | | | |

| Network Address 602 | Mask 604 | Ingress Mirroring Bit 606 | Egress Mirroring Bit 608 | Other Fields and/or Flags 610 |
|---|---|---|---|---|
| | | | | |
| | | | | |
| | | | | |
| | | | | |

| Filter Element 802 | Mirroring Bit 804 | Other Fields and/or Flags 806 |
|---|---|---|
| | | |
| | | |
| | | |

METHODS AND APPARATUS FOR SELECTION OF MIRRORED TRAFFIC

BACKGROUND OF THE INVENTION

1. Field of the Invention

The present invention relates generally to networking and communications technology.

2. Description of the Background Art

Conventional mirroring solutions are highly intrusive to the network administrator, especially in large networks, requiring his/her dispatch to the physical location of the device being monitored. This is because the network analysis device is directly attached to the networking device which needs monitoring.

SUMMARY

One embodiment of the invention pertains to a method for mirroring of select network traffic. A data packet is received by a network device. A determination is made as to whether a designated aspect of the packet matches a flagged entry in a look-up table on the network device. If a match is found, then copy of the packet is sent to an associated mirror destination.

Another embodiment of the invention relates to a networking apparatus. The apparatus includes at least an operating system, a look-up table, and a mirroring engine. The operating system includes routines utilized to control the apparatus, and the look-up table includes selection information for mirror sources. The mirroring engine forwards copies of selected packets to a corresponding mirror destination.

Another embodiment of the invention relates to a method of selecting packets to mirror from network traffic: A data packet is received by a network device, and a determination is made as to whether characteristics of the packet matches static mirroring criteria from a look-up table on the network device. State information relating to the network traffic is checked against dynamic mirroring criteria. A copy of the packet is sent to an associated mirror destination if the characteristics of the packet matches the static mirroring criteria and if the state information matches the dynamic mirroring criteria.

BRIEF DESCRIPTION OF THE DRAWINGS

FIG. 2 is a schematic diagram depicting a MAC look-up table in accordance with an embodiment of the invention.

FIG. 4 is a schematic diagram depicting an IP look-up table in accordance with an embodiment of the invention.

FIG. 6 is a schematic diagram depicting a subnet table in accordance with an embodiment of the invention.

FIG. 8 is a schematic diagram depicting an ACL in accordance with an embodiment of the invention.

DETAILED DESCRIPTION

As mentioned above, in conventional mirroring solutions, the network analysis device is directly attached to the networking device which needs monitoring. This limits the usefulness of the conventional solutions.

Remote mirroring overcomes this limitation by allowing for the network monitoring device to be located remotely from the monitored networking device. Current remote mirroring technologies include Remote Switched Port Analyzer (RSPAN) technology from Cisco Systems of San Jose, Calif. With RSPAN, packets may be mirrored from source ports (or source VLANs) to a specific RSPAN virtual local area network (VLAN). This allows the monitoring device to be on a different switch from the one being monitored. However, the monitoring device must still be within the OSI layer 2 domain of the traffic which is to be monitored.

Of interest in the present application, the Cisco RSPAN technology uses port-based and VLAN-based mirroring sources. However, the mirroring sources are limited thereto. Other conventional mirroring solutions known to applicants also select packets to mirror based on source ports and/or source VLANs.

Applicants believe that it is desirable to invent mirroring methods and apparatus with greater flexibility than prior art methods and apparatus. In particular, greater flexibility may be advantageously provided by enabling other types of mirroring sources. Hence, in accordance with an embodiment of the present invention, circuitry and/or code in a networking device is configurable to mirror packets from various source types, not just ports or VLANs. These and other advantages are provided by embodiments of the present invention.

Figure 1A:
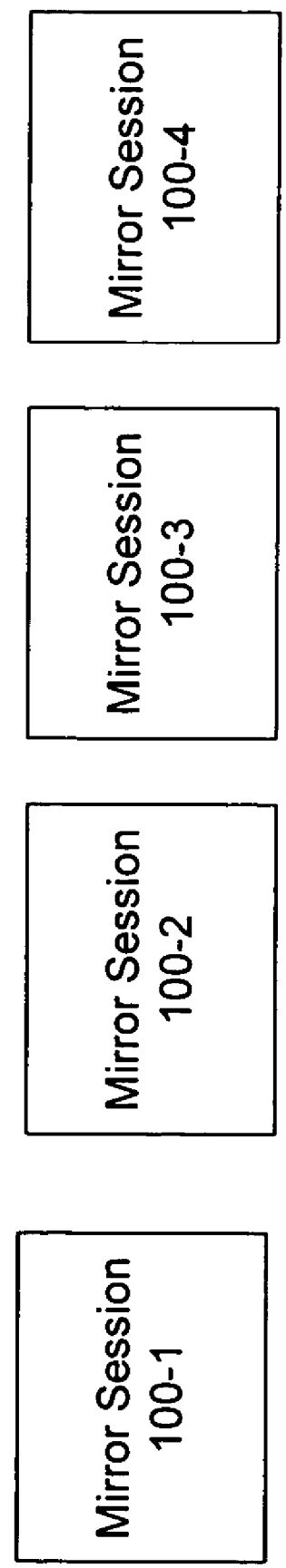
FIG. 1A is a schematic diagram depicting multiple mirroring sessions in accordance with an embodiment of the invention.

FIG. 1A is a schematic diagram depicting multiple mirroring sessions in accordance with an embodiment of the invention. For example, four mirror sessions 100-1, 100-2, 100-3, and 100-4 are illustrated. Other number of mirror sessions 100 may also be utilized by a networking apparatus in accordance with an embodiment of the invention.

A mirror session 100 comprises one instance of mirroring configured on the networking apparatus. In one implementation, the numbers of mirror sessions 100 on the apparatus may be limited to a maximum number of such sessions 100.

Figure 1B:
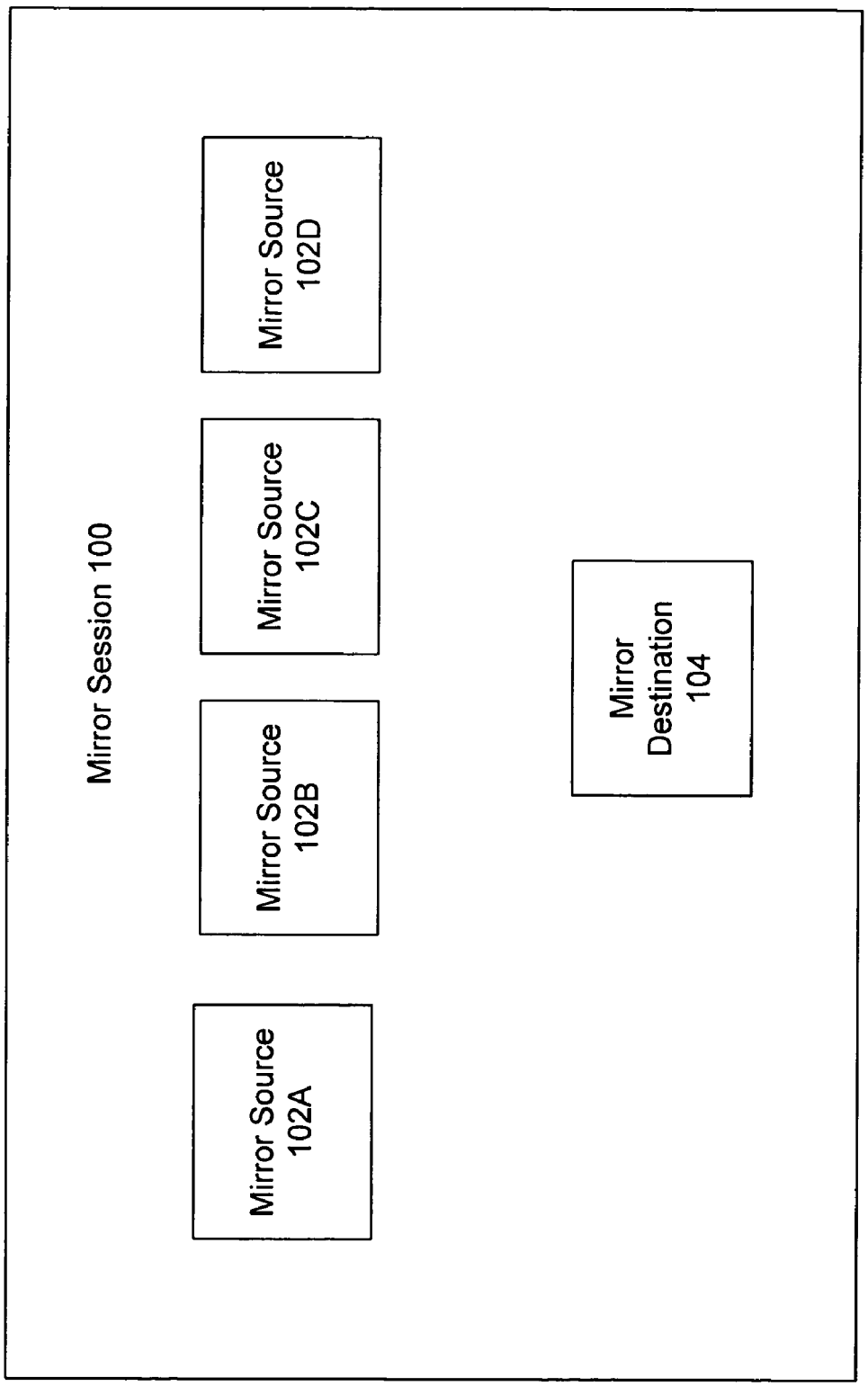
FIG. 1B is a schematic diagram depicting components of a mirror session in accordance with an embodiment of the invention.

FIG. 1B is a schematic diagram depicting components of a mirror session 100 in accordance with an embodiment of the invention. As illustrated, each mirror session 100 may comprise one or multiple mirror sources 102 and a single mirror destination 104. While four mirror sources 102-A, 102-B, 102-C, and 102-D are illustrated for purposes of example, various numbers of sources 102 may be configured per session 100. Each mirror source 102 may comprise a traffic selection mechanism, various types of which are described in further detail below.

Figure 1C:
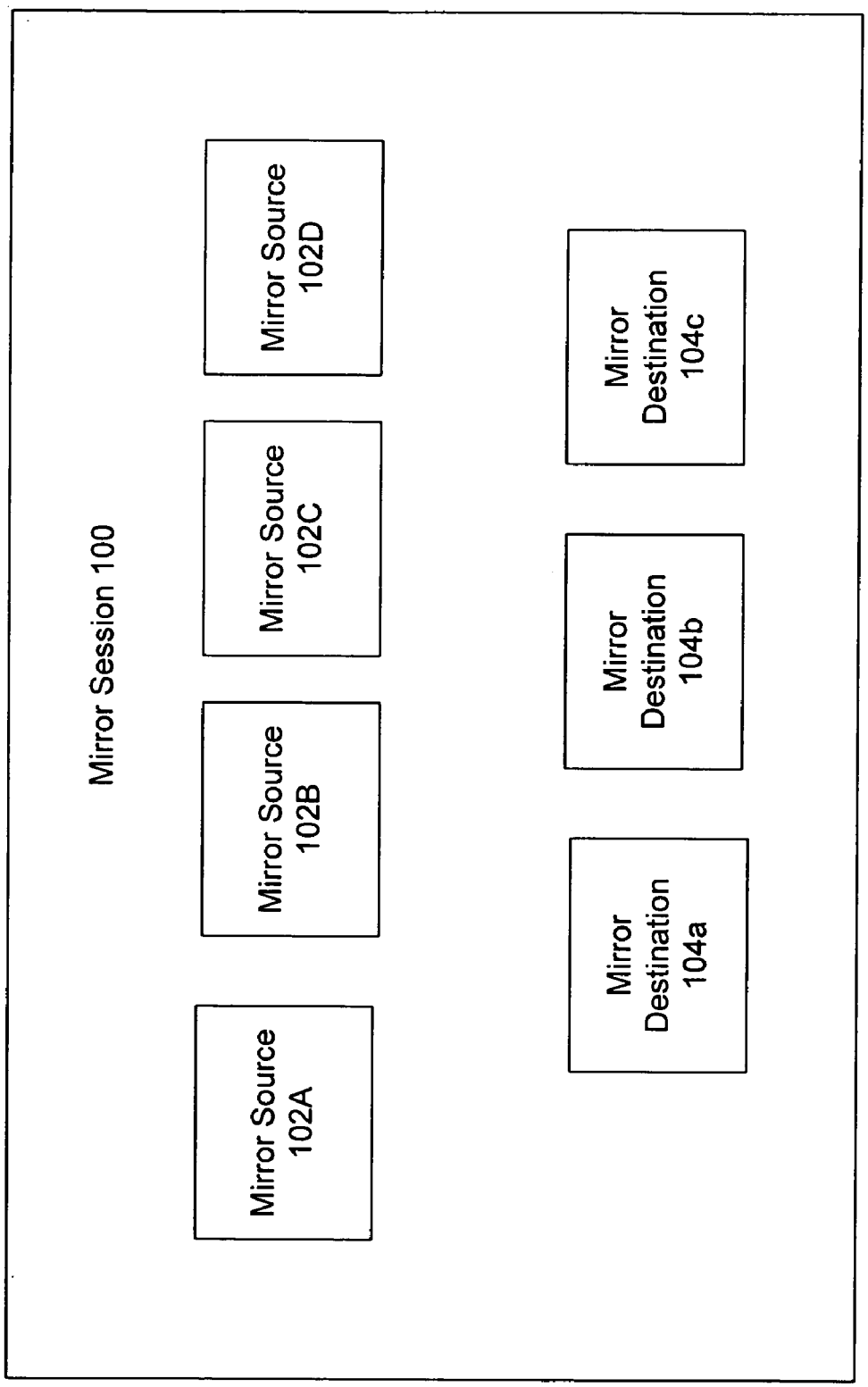
FIG. 1C is a schematic diagram depicting components of a mirror session in accordance with another embodiment of the invention.

Also, more than one destination address may be specified for a mirror session in accordance with another embodiment of the invention. FIG. 1C is a schematic diagram depicting a mirror session 100 having both multiple mirror sources 102 and multiple mirror destinations 104 to which the mirrored packets are copied.

FIG. 2 is a schematic diagram depicting a media access control (MAC) look-up table (LUT) 200 in accordance with an embodiment of the invention. As illustrated, the MAC LUT 200 includes various fields for each of its entries. The fields may include a MAC source address (SA) 202, a MAC destination address (DA) 204, an ingress mirroring bit (flag) 206, an egress mirroring bit (flag) 208, and other fields and flags 210. The other fields and flags 210 may relate to functions other than traffic selection. Utilization of such a MAC LUT 200 in the context of traffic selection is described below in relation to FIG. 3. In other embodiments, the LUT 200 may include only an ingress flag or only an egress flag (and not the other), resulting in smaller entries.

Figure 3A:
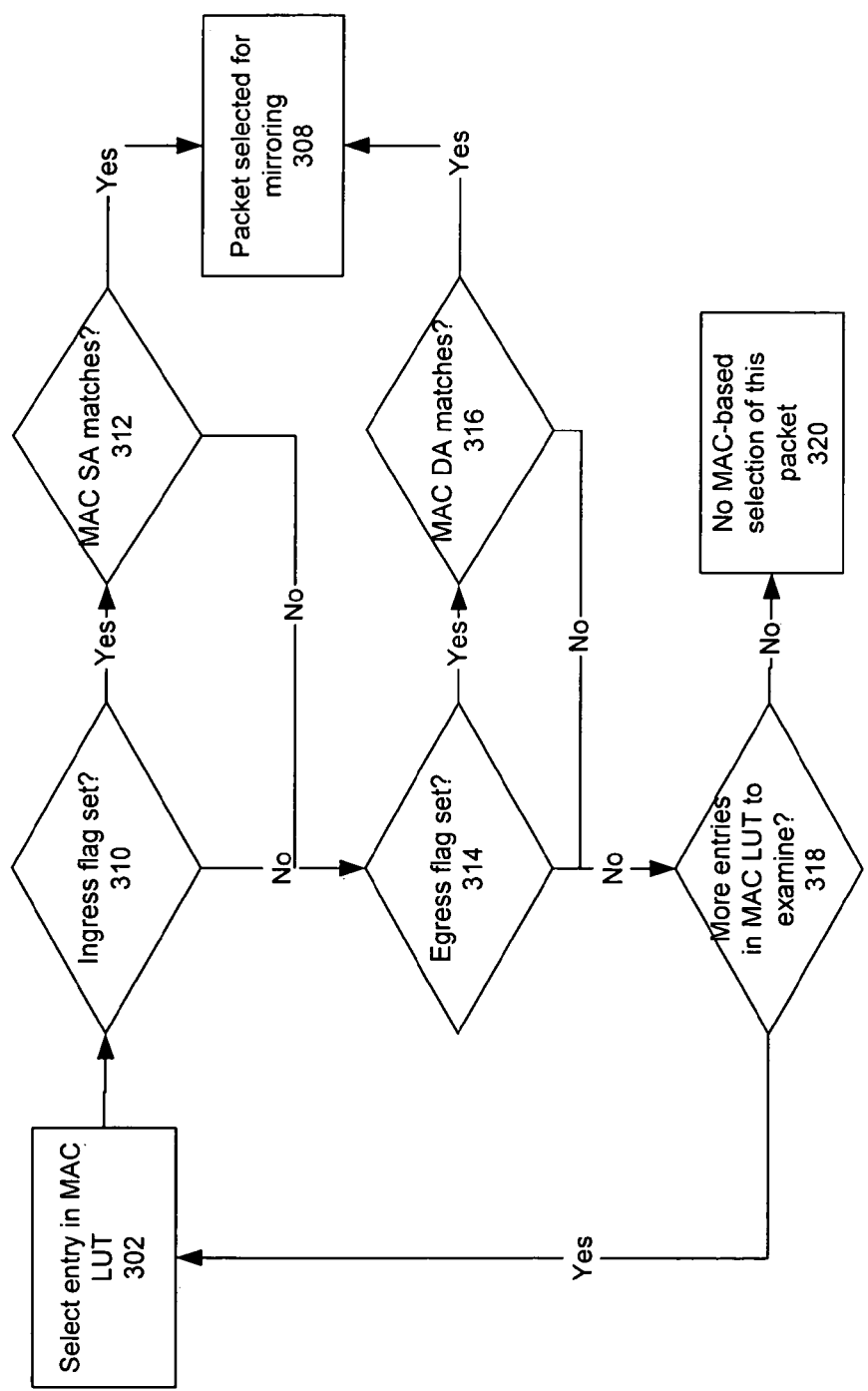
FIGS. 3A and 3B are flow charts depicting methods of MAC-based traffic selection in accordance with an embodiment of the invention.

FIG. 3A is a flow chart depicting a method 300 of MAC-based traffic selection in accordance with an embodiment of the invention. The method 300 may be performed by a networking apparatus upon receipt of a data packet. The example method 300 shown involves going through the entries in the MAC LUT to determine whether or not the packet is selected for mirroring based on its MAC address (es).

In accordance with an embodiment of the invention, an entry in the MAC LUT is selected 302. A determination 310 may be made as to whether just the ingress mirroring flag is set. If so, then a further determination 312 is made as to whether the MAC SA of the packet matches the MAC SA of the table entry. If it matches, then the packet is selected 308 for mirroring.

If the ingress flag is not set or if the MAC SA does not match, then a determination 314 may be made as to whether just the egress mirroring flag is set. If so, then a further determination 316 is made as to whether the MAC DA of the packet matches the MAC DA of the table entry. If it matches, then the packet is selected 308 for mirroring.

Finally, if the egress flag is not set, or if the MAC DA does not match, then a determination 318 is made as to whether there are more unexamined entries in the MAC LUT 200. If so, then the next entry is selected 302. If not, then a conclusion is reached 320 that there is no MAC-based selection of this packet (at least not based on this MAC LUT). In one embodiment, each mirror session may utilize its own MAC LUT for MAC-based traffic selection.

FIG. 3A illustrates steps in one specific method of MAC-based traffic selection. The specific steps in the method may be re-ordered, or modified, within other embodiments of the invention. For example, perhaps only mirroring based on the MAC SA may be configured, or perhaps only mirroring based on the MAC DA may be configured.

Figure 3B:
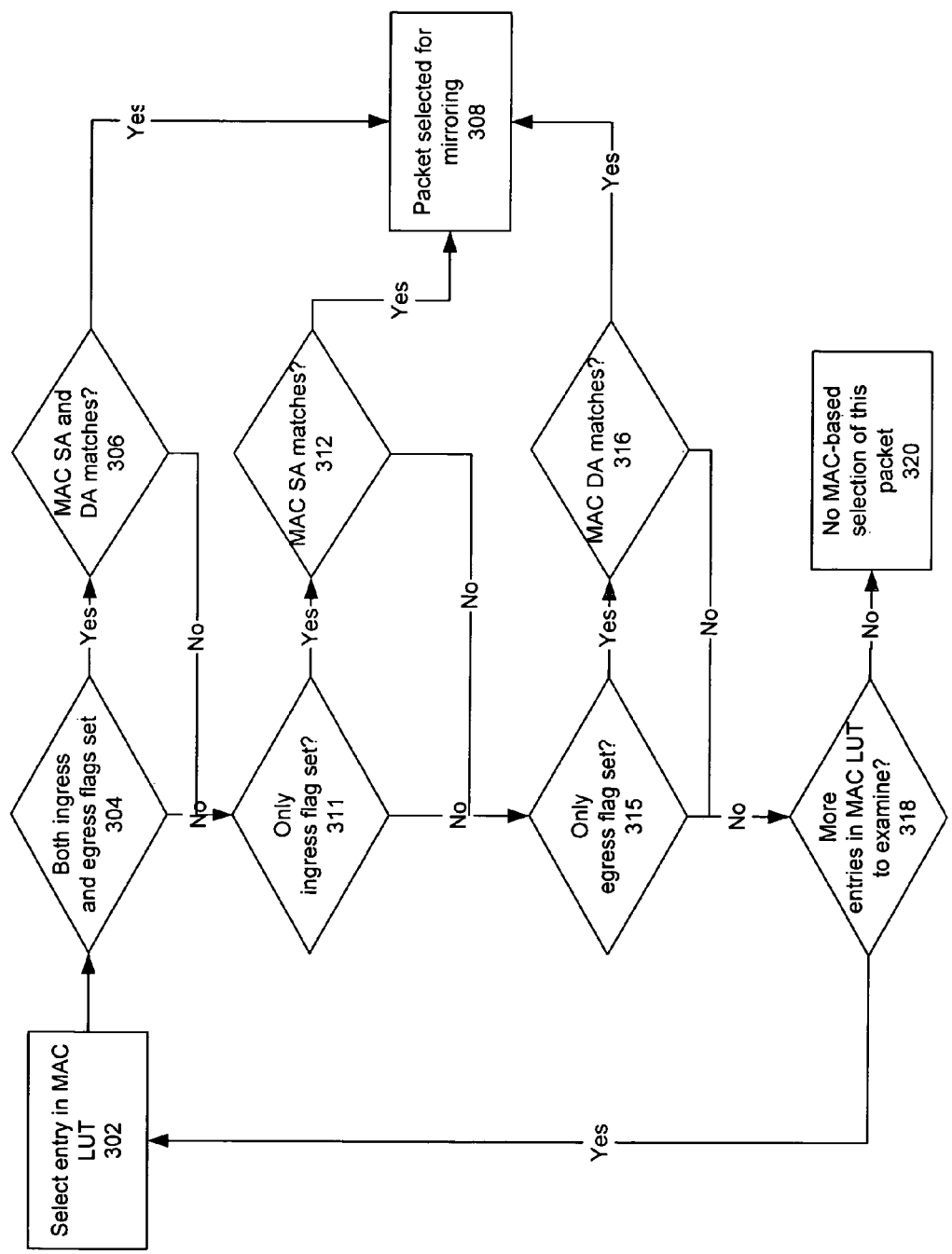

In the method of FIG. 3A, if both ingress and egress mirroring bits are set, then either the source address or destination address may match to mirror. In an alternate embodiment, if both ingress and egress mirroring bits are set, then both the source and destination addresses must match to mirror. A flow chart for such an alternate method 350 is depicted in FIG. 3B. As shown in FIG. 3B, if both ingress and egress flags are set 304, then the MAC SA and DA must both match 306 in order for the packet to be selected for mirroring 308. If only the ingress flag (and not the egress flag) is set 311, then the MAC SA (but not the MAC DA) must match 312 in order for the packet to be selected for mirroring 308. If only the egress flag (and not the ingress flag) is set 315, then the MAC DA (but not the MAC SA) must match 316 in order for the packet to be selected for mirroring 308.

In a further embodiment, an additional "or/and" flag may be included in the LUT 200 to select between the two ("either" or "both") interpretations of the ingress and egress bits being set. If the and/or flag indicates "or", then either source or destination addresses must match to mirror. On the other hand, if the and/or flag indicates "and", then both source and destination addresses must match to mirror when both ingress and egress flags are set.

In one embodiment, a "stop on first match" feature may be advantageously implemented. With this feature, when an entry with matching source and/or destination MAC addresses are found, then the mirror flag(s) for that entry are checked. Whether or not the flags are set, no further entries need be examined. The "stop on first match" feature is particularly advantageous with a MAC LUT 200 implemented using content addressable memory, and it may also be useful in linear or hash lookups.

Other MAC header fields besides, or in addition to, the MAC addresses may be used for the lookups. For example, the type/length field of the MAC header may be used instead of, or in addition to, the MAC address fields as the basis for the lookups (either by itself, or in combination with other fields). Other fields, such as the port number and/or VLAN identifier, may also be utilized by the lookups.

FIG. 4 is a schematic diagram depicting an Internet protocol (IP) LUT 400 in accordance with an embodiment of the invention. As illustrated, the IP LUT 400 includes various fields for each of its entries. The fields may include an IP source address (SA) 402, an IP destination address (DA) 404, an ingress mirroring bit (flag) 406, an egress mirroring bit (flag) 408, and other fields and flags 410. The other fields and flags 410 may relate to functions other than traffic selection. Utilization of such an IP LUT 400 in the context of traffic selection is described below in relation to FIG. 5. In other embodiments, the LUT 400 may include only an ingress flag or only an egress flag (and not the other), resulting in smaller entries.

Figure 5A:
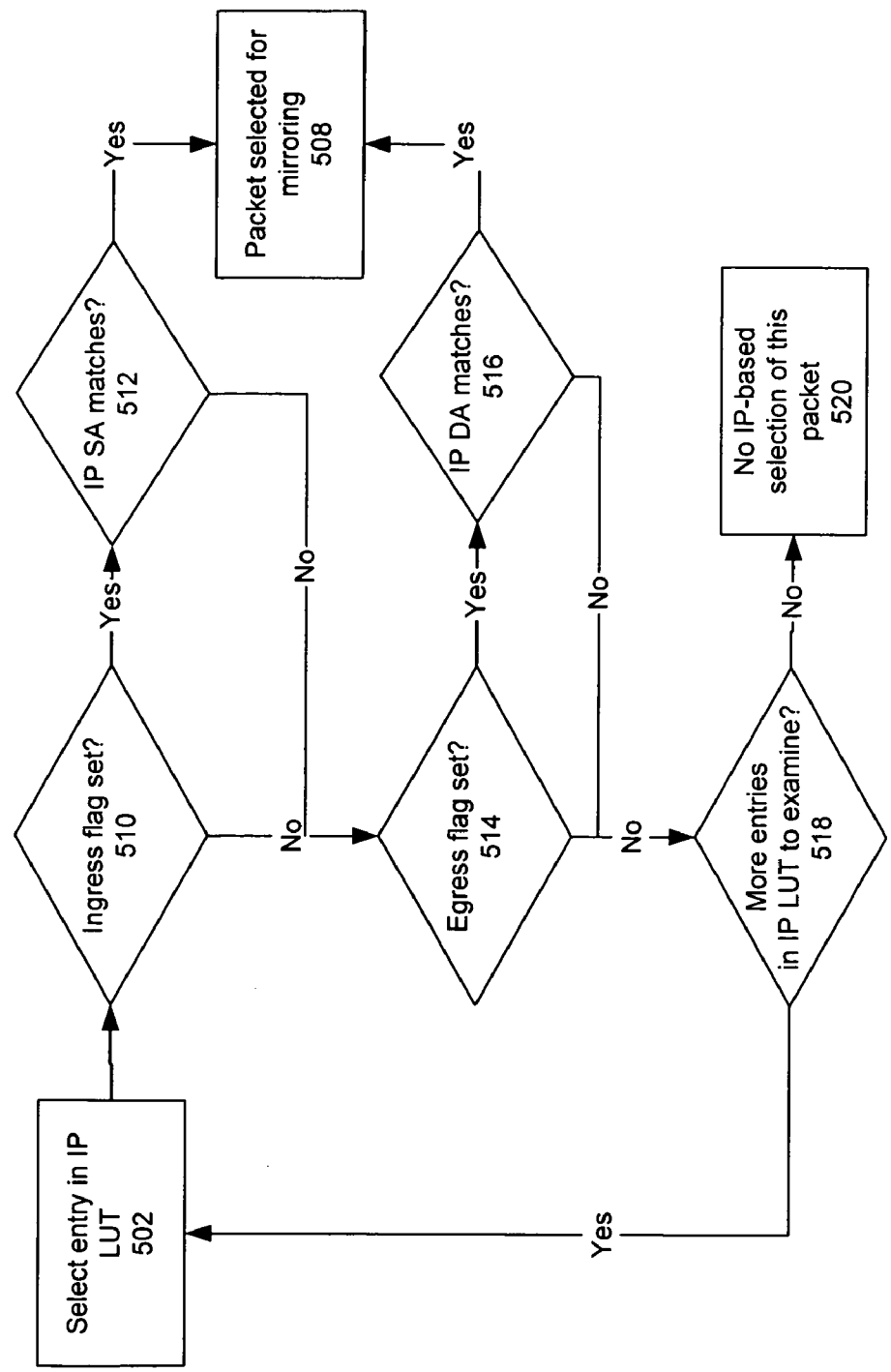
FIGS. 5A and 5B are flow charts depicting methods of IP-based traffic selection in accordance with an embodiment of the invention.

FIG. 5A is a flow chart depicting a method 500 of IP-based traffic selection in accordance with an embodiment of the invention. The method 500 may be performed by a networking apparatus upon receipt of a data packet. The example method 500 shown involves going through the entries in the IP LUT to determine whether or not the packet is selected for mirroring based on its IP address(es).

In accordance with an embodiment of the invention, an entry in the IP LUT is selected 502. A determination 510 may be made as to whether just the ingress mirroring flag is set. If so, then a further determination 512 is made as to whether the IP SA of the packet matches the IP SA of the table entry. If it matches, then the packet is selected 508 for mirroring.

If the ingress flag is not set or if the IP SA does not match, then a determination 514 may be made as to whether just the egress mirroring flag is set. If so, then a further determination 516 is made as to whether the IP DA of the packet matches the IP DA of the table entry. If it matches, then the packet is selected 508 for mirroring.

Finally, if the egress flag is not set, or if the IP DA does not match, then a determination 518 is made as to whether there are more unexamined entries in the IP LUT 400. If so, then the next entry is selected 502. If not, then a conclusion is reached 520 that there is no IP-based selection of this packet (at least not based on this IP LUT). In one embodiment, each mirror session may utilize its own IP LUT for IP-based traffic selection.

FIG. 5A illustrates steps in one specific method of IP-based traffic selection. The specific steps in the method may be re-ordered, or modified, within other embodiments of the invention. For example, perhaps only mirroring based on the IP SA may be configured, or perhaps only mirroring based on the IP DA may be configured.

Figure 5B:
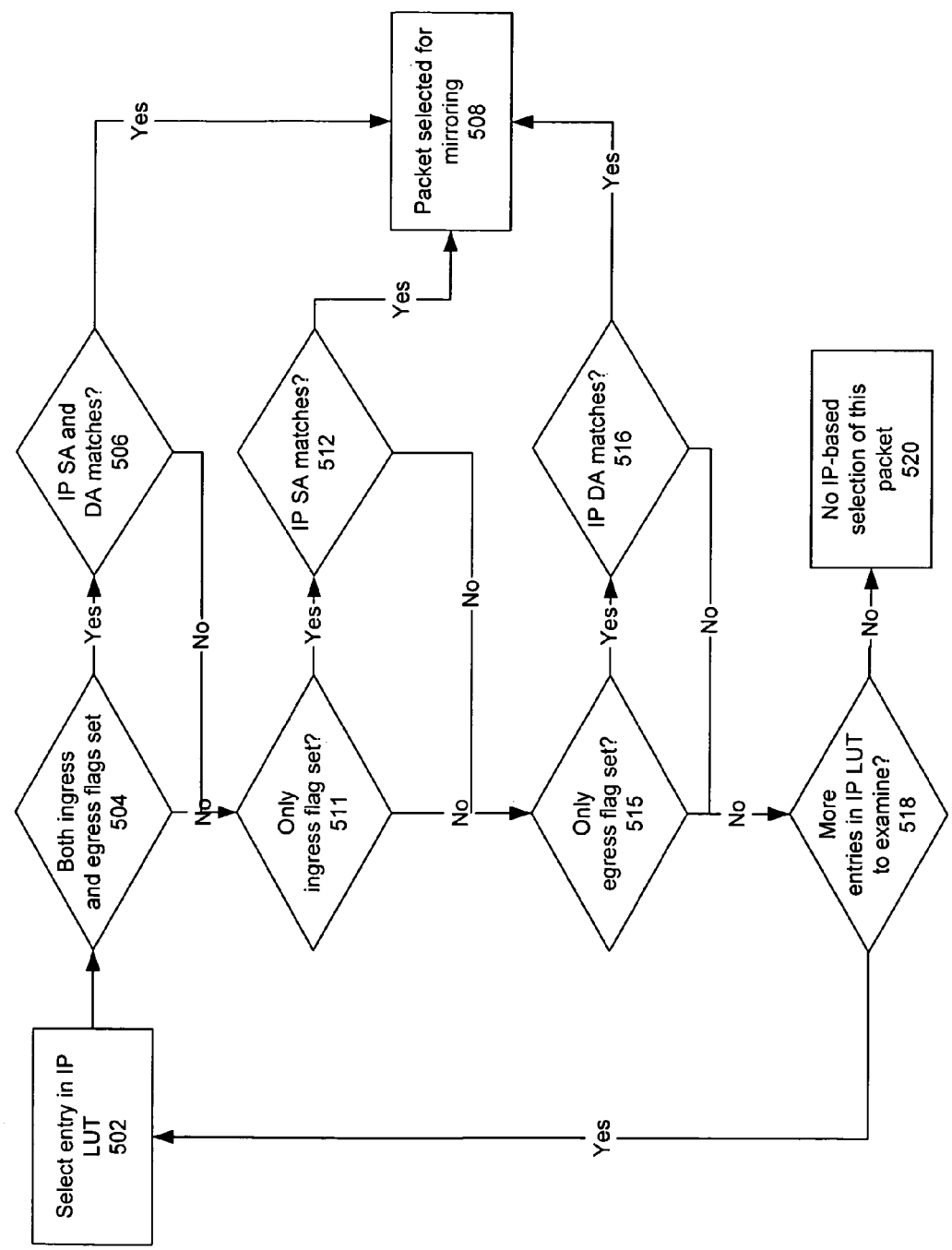

In the method of FIG. 5A, if both ingress and egress mirroring bits are set, then either the source address or destination address may match to mirror. In an alternate embodiment, if both ingress and egress mirroring bits are set, then both the source and destination addresses must match to mirror. A flow chart for such an alternate method 550 is depicted in FIG. 5B. As shown in FIG. 5B, if both ingress and egress flags are set 504, then the IP SA and DA must both match 506 in order for the packet to be selected for mirroring 508. If only the ingress flag (and not the egress flag) is set 511, then the IP SA (but not the IP DA) must match 512 in order for the packet to be selected for mirroring 508. If only the egress flag (and not the ingress flag) is set 515, then the IP DA (but not the IP SA) must match 316 in order for the packet to be selected for mirroring 308.

In a further embodiment, an additional "or/and" flag may be included in the LUT 400 to select between the two ("either" or "both") interpretations of the ingress and egress bits being set. If the and/or flag indicates "or", then either source or destination addresses must match to mirror. On the other hand, if the and/or flag indicates "and", then both source and destination addresses must match to mirror when both ingress and egress flags are set.

In one embodiment, a "stop on first match" feature may be advantageously implemented. With this feature, when an entry with matching source and/or destination IP addresses are found, then the mirror flag(s) for that entry are checked. Whether or not the flags are set, no further entries need be examined. The "stop on first match" feature is particularly advantageous with a IP LUT 400 implemented using content addressable memory, and it may also be useful in linear or hash lookups.

Other IP header fields besides, or in addition to, the IP addresses may be used for the lookups. For example, the length field, type of service field, or protocol field of the IP header may be used instead of, or in addition to, the IP address fields as the basis for the lookups (either by themselves, or in combination with other fields). Other fields, such as the port number and/or VLAN identifier, may also be utilized by the lookups.

Note that while the above-discussed methods of FIGS. 3A, 3B, 5A, and 5B depict linear searches, other search techniques may be used within the spirit of the invention. In alternate embodiments, a hash table may be used in performing the searches. In case of conflicts, multiple hashes may be utilized. Other search algorithms, such as "b-tree", may also be used. In other embodiments, the look-up tables of FIGS. 2 and 4 may be implemented via content addressable memory. In those embodiments, a preferred search technique would utilize the "stop on first match" feature.

FIG. 6 is a schematic diagram depicting a subnet look-up table 600 in accordance with an embodiment of the invention. As shown, the subnet table 600 may comprise various fields for each of its entries. The fields may include a network address 602, a mask 604, an ingress mirroring bit (flag) 606, an egress mirroring bit (flag) 608, and other fields and flags 610. The other fields and flags 610 may relate to functions other than traffic selection. Utilization of such a subnet table 600 in the context of traffic selection is described below in relation to FIG. 7. Such a subnet table 600 is similar to, and may be a modified version of, a best matching prefix (BMP) table often used in routers. In the context of a BMP table, the network address 602 may correspond to a route address, and the mask 604 may correspond to a route mask. In other embodiments, the subnet table 600 may include only an ingress flag or only an egress flag (and not the other), resulting in smaller entries. In one specific embodiment, the subnet table 600 comprises a BMP table implemented using a form of content addressable memory for rapid access.

Figure 7A:
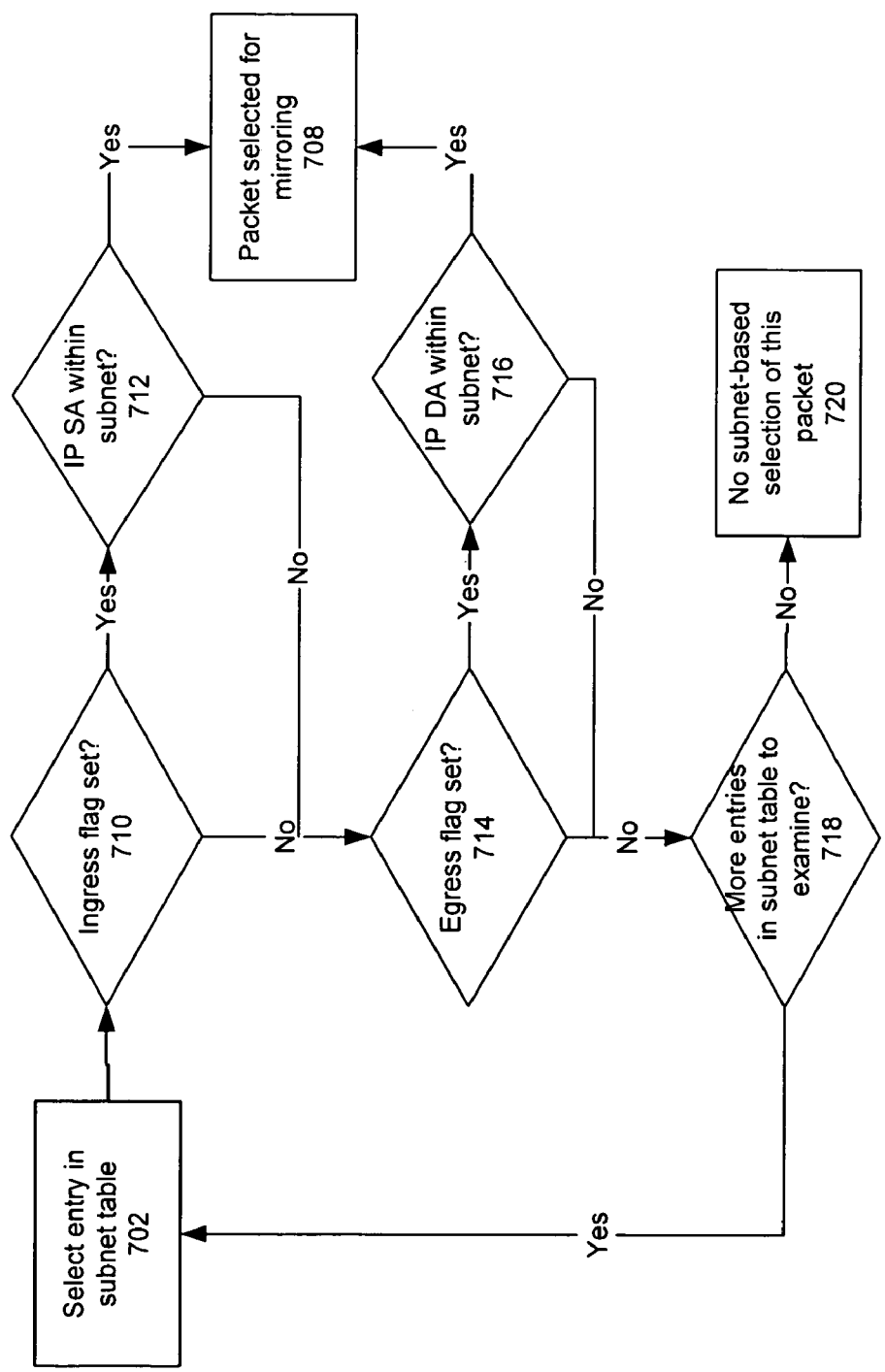
FIGS. 7A and 7B are flow charts depicting methods of subnet-based traffic selection in accordance with an embodiment of the invention.

FIG. 7A is a flow chart depicting a method 700 of subnet-based traffic selection in accordance with an embodiment of the invention. The method 700 may be performed by a networking apparatus upon receipt of a data packet. The example method 700 shown involves going through the entries in the subnet table to determine whether or not the packet is selected for mirroring based on its destination IP address.

In accordance with an embodiment of the invention, an entry in the subnet table 600 is selected 702. A determination 710 may be made as to whether just the ingress mirroring flag is set. If so, then a further determination 712 is made as to whether the IP SA of the packet is within the IP subnet identified by the table entry. If the SA is within the subnet, then the packet is selected 708 for mirroring.

If the ingress flag is not set or if the IP SA is not within the subnet, then a determination 714 may be made as to whether just the egress mirroring flag is set. If so, then a further determination 716 is made as to whether the IP DA of the packet is within the IP subnet identified by the table entry. If the DA is within the subnet, then the packet is selected 708 for mirroring.

Finally, if the egress flag is not set, or if the IP DA is not within the subnet, then a determination 718 is made as to whether there are more unexamined entries in the subnet table 600. If so, then the next entry is selected 702. If not, then a conclusion is reached 720 that there is no subnet-based selection of this packet (at least not based on this subnet table). In one embodiment, each mirror session may utilize its own subnet table for subnet-based traffic selection.

FIG. 7A illustrates steps in one specific method of subnet-based traffic selection. The specific steps in the method may be re-ordered, or modified, within other embodiments of the invention. For example, perhaps only mirroring based on the IP SA may be configured, or perhaps only mirroring based on the IP DA may be configured.

Figure 7B:
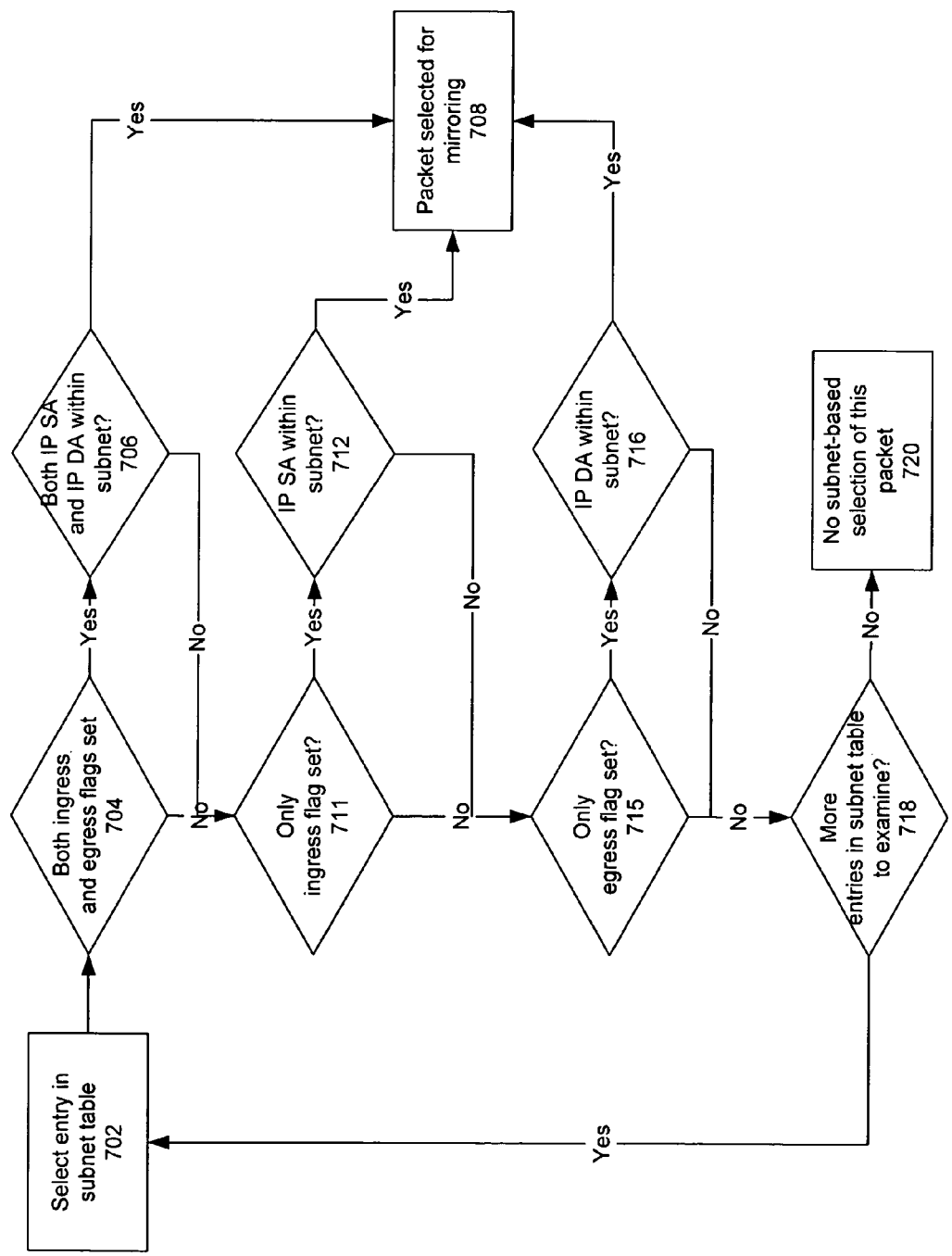

In the method of FIG. 7A, if both ingress and egress mirroring bits are set, then either the source address or destination address may be within the subnet to mirror. In an alternate embodiment, if both ingress and egress mirroring bits are set, then both the source and destination addresses must be within the subnet to mirror. A flow chart for such an alternate method 750 is depicted in FIG. 7B. As shown in FIG. 7B, if both ingress and egress flags are set 704, then the IP SA and DA must both be within the subnet 706 in order for the packet to be selected for mirroring 708. If only the ingress flag (and not the egress flag) is set 711, then the IP SA (but not the IP DA) must be within the subnet 712 in order for the packet to be selected for mirroring 708. If only the egress flag (and not the ingress flag) is set 715, then the IP DA (but not the IP SA) must be within the subnet 716 in order for the packet to be selected for mirroring 708.

In a further embodiment, an additional "or/and" flag may be included in the LUT 600 to select between the two ("either" or "both") interpretations of the ingress and egress bits being set. If the and/or flag indicates "or", then either source or destination addresses must be within the subnet to mirror. On the other hand, if the and/or flag indicates "and", then both source and destination addresses must be within the subnet to mirror when both ingress and egress flags are set. Other fields may be used (either by themselves, or in combination with other fields) for the lookups. For example, the port number and/or VLAN identifier may also be utilized by the lookups.

FIG. 8 is a schematic diagram depicting an access control list (ACL) 800 in accordance with an embodiment of the invention. An ACL 800 generally includes one or more access control entries that collectively define a network traffic profile. This traffic profile may be utilized for traffic filtering and other purposes. For example, traffic may be selected that comprises a ternary match to characteristics specified by the ACL. In one embodiment, the ACL 800 may be advantageously implemented using content addressable memory (CAM) for rapid access to the data therein.

As shown, the ACL 800 in accordance with one embodiment may comprise various fields for each of its entries. The fields may include a filter element 802, a mirroring bit (flag) 804, and other fields and flags 806. The other fields and flags 806 may relate to functions other than traffic selection. For example, the other fields and flags 806 may include port number and/or VLAN identifier information. Utilization of such an ACL 800 in the context of traffic selection is described below in relation to FIG. 9.

Figure 9:
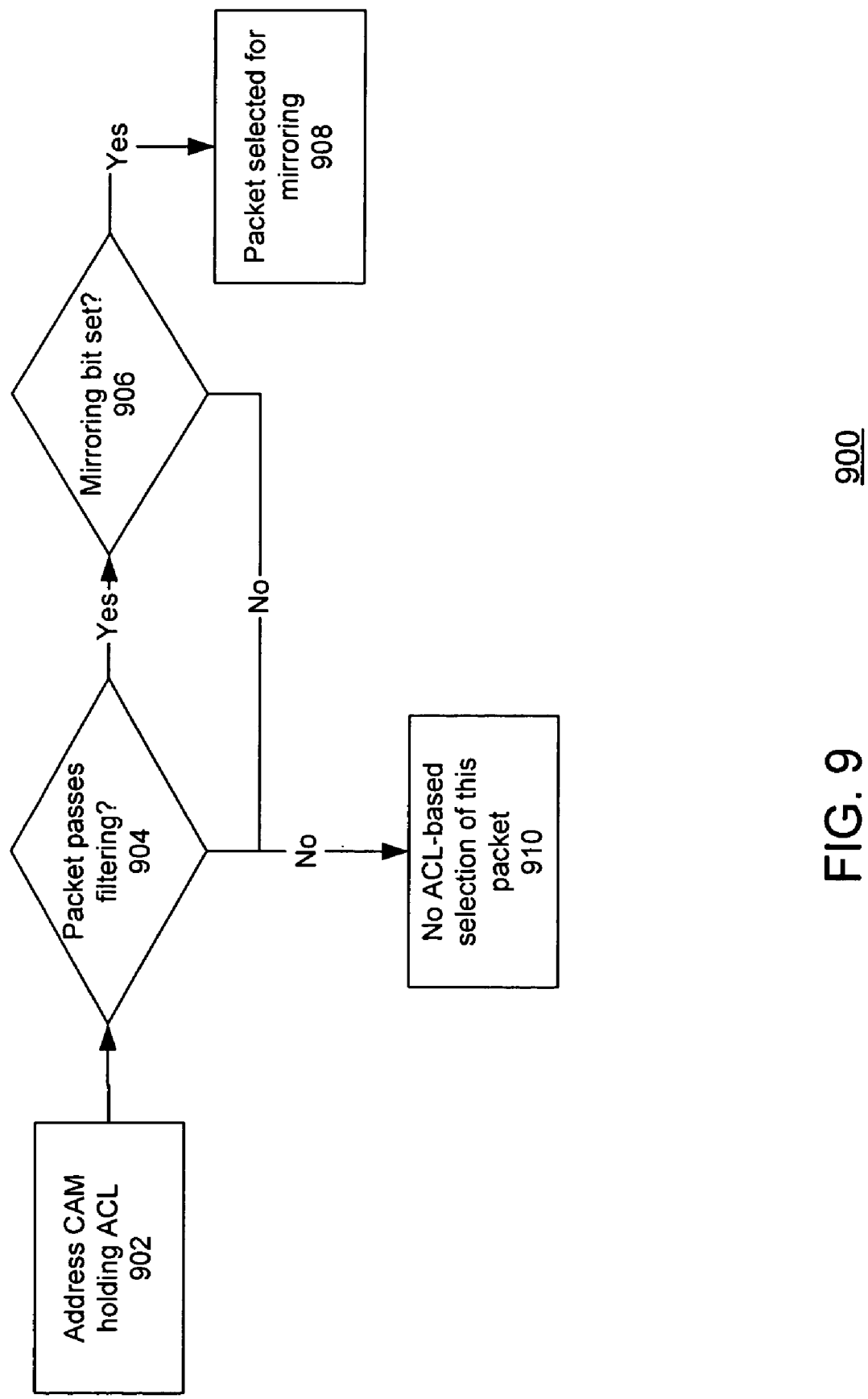
FIG. 9 is a flowchart depicting a method of ACL-based traffic selection in accordance with an embodiment of the invention.

FIG. 9 is a flow chart depicting a method 900 of ACL-based traffic selection in accordance with an embodiment of the invention. The method 900 may be performed by a networking apparatus upon receipt of a data packet. The example method 900 shown involves going through the entries in the ACL to determine whether or not the packet is selected for mirroring based on specified characteristics thereof. Various ACL fields may be used for matching purposes. For example, networking layer 3 (IP) address fields may be used. As another example, networking layer 4 (TCP/UDP) port numbers may also be used. Other fields deeper in the packet (relating to networking layers 5 and above) may also be used.

In accordance with an embodiment of the invention, a CAM holding the ACL is addressed 902. If so, then a determination 904 is made as to whether specified characteristics of the packet passes a filter element or filter elements in the ACL. If the packet passes a filter element, a further determination 906 may then be made as to whether the mirroring flag for that entry is set. If so, then the packet is selected 908 for mirroring.

If the packet does not pass a filter element, or if the mirroring flag is not set, then a conclusion is reached 910 that there is no ACL-based selection of this packet (at least not based on this list). In one embodiment, each mirror session may utilize its own ACL for ACL-based traffic selection.

FIG. 9 illustrates steps in one specific method of ACL-based traffic selection. The specific steps in the method may be re-ordered, or modified, within other embodiments of the invention.

Note also that once packets are selected for mirroring, they may be mirrored to any number of destinations. The system may be configured to mirror the packets to a single destination, or the system may be configured to mirror the packets to multiple destinations, for example, by splitting the packet across a trunk or by multicasting to many analyzers simultaneously.

Figure 10:
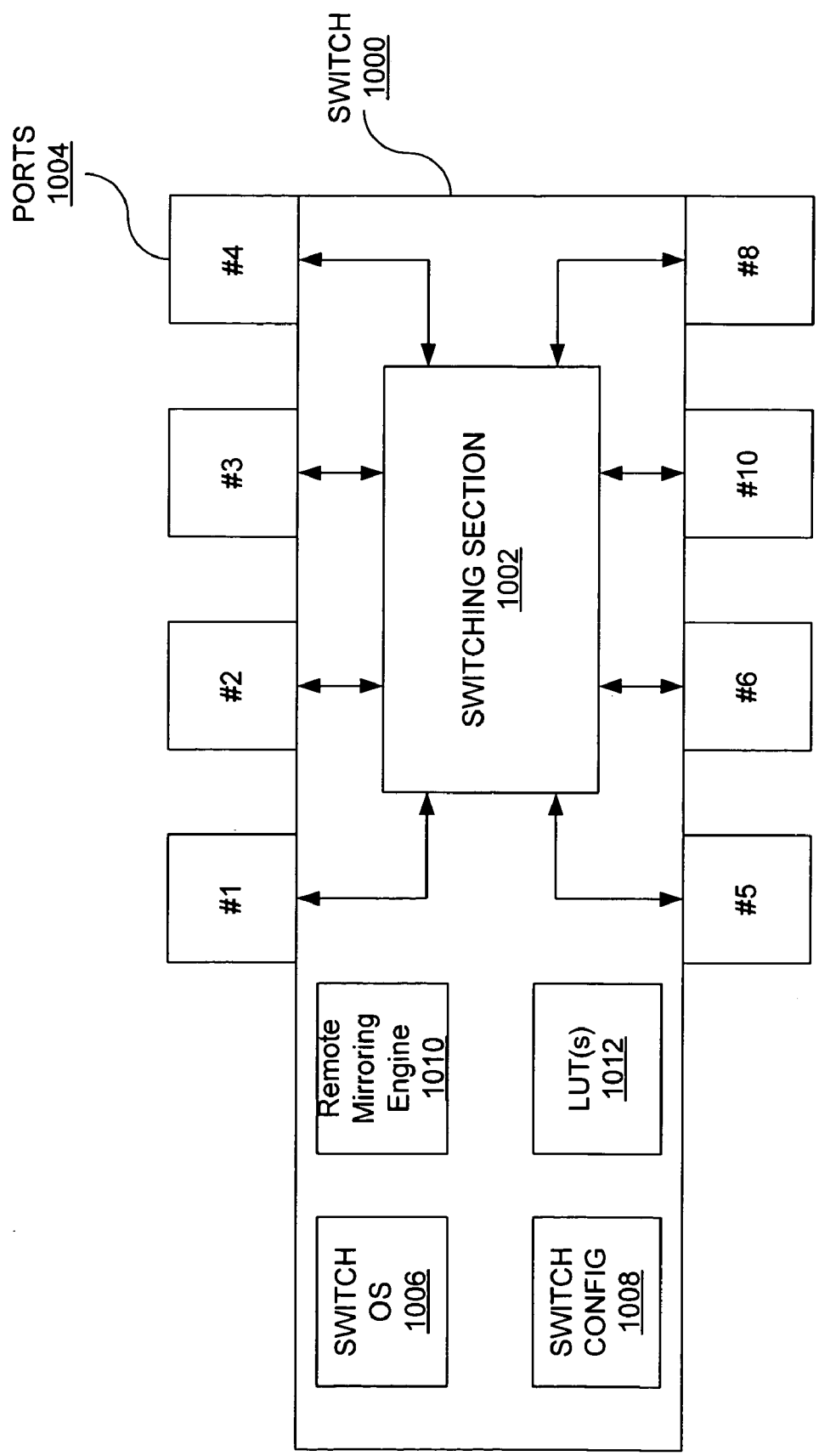
FIG. 10 is a schematic diagram illustrating a networking apparatus in accordance with an embodiment of the invention.

FIG. 10 is a schematic diagram illustrating a networking switch in accordance with an embodiment of the invention. The switch 1000 includes a switching section 1002, a plurality of switch ports 1004, a switch operating system (OS) 1006, a switch configuration 1008, a mirroring engine 1010, and one or more look-up tables (LUTs) 1012.

For example, a LUT 1012 may comprise a MAC LUT as described above in relation to FIG. 2, an IP LUT as described above in relation to FIG. 4, a subnet table as described above in relation to FIG. 6, or an access control list as described above in relation to FIG. 8. Such a switch 1000 may be utilized as the entry device for mirroring of data packets in accordance with an embodiment of the invention.

The switching section 1002 is coupled to each of the ports 1004. The switching section may include, for example, a switching core such as a crossbar switch or other circuitry, and makes connections between the ports 1004 so that data frames can be transferred from one port to another port. Eight switch ports 1004 are shown in this example. The ports 1004 are shown as numbered, for example, as #1, #2, #3, #4, #5, #6, #7, and #8. Of course, other implementations may include any number of ports.

The switch OS 1006 includes software routines used to control the operation of the switch 1000. The switch configuration file 1008 includes configuration information utilized by the switch OS 1006. For example, the switch configuration file 1008 may include the configuration data for the mirroring session or sessions. The remote mirroring engine 1010 includes circuitry to implement the technology which copies and forwards the packets to be mirrored.

While FIG. 10 depicts a switch device, other types of networking apparatus may be configured with an operating system, configuration file, mirroring engine, and one or more look-up table(s) in accordance with an embodiment of the invention. For example, the apparatus may comprise a router.

An additional patentable aspect involves maintaining dynamic state information about the packet flow and checking that state information against "dynamic" mirroring criteria before mirroring a packet. In one particular embodiment, the state information may comprise the number of packets that have so far matched the above-discussed "static" mirroring criteria, and one or more counters may be utilized to track that number. For example, by using such a counter, the method or apparatus may be configured such that only every "nth" (for example, every $5^{th}$ or every $100^{th}$, etc.) packet that matches the static criteria is actually sent to the mirror destination. In other embodiments, the dynamic state information may comprise a time between mirrored packets, or whether a valid TCP connection has been formed, or whether an allocated bandwidth for this set of packets has been used up.

The above disclosure advantageously describes various new traffic selection mechanisms for mirroring purposes. In one embodiment, multiple traffic selection mechanisms may be combined in a single mirror session to mirror packets to a single corresponding mirroring destination. Furthermore, multiple mirror sessions may be configured in a single networking apparatus.

The mirroring of selected traffic may comprise remote mirroring, local mirroring, or both. Local mirroring comprises mirroring to a port on the same apparatus. Various technologies may be used to implement remote mirroring (copying and forwarding) of the selected traffic. One such technology comprises encapsulation of copies of the packets and forwarding of the encapsulated copies. The encapsulation may be accomplished by way of IP encapsulation over a layer 3 network, or alternatively, by way of MAC encapsulation over a layer 2 network. Non-encapsulation technology may also be utilized, such as VLAN tagging and forwarding copies of the packets, or using a separate network of dedicated mirroring links.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method for mirroring of select network traffic, the method comprising:
   receiving a data packet by a network device;
   determining whether a designated aspect of the packet matches a flagged entry in a look-up table on the network device; and
   sending a copy of the packet to an associated mirror destination if a match is found.

2. The method of claim 1, wherein the LUT comprises a media access (MAC) address table.

3. The method of claim 2, wherein the designated aspect used for matching comprises a source MAC address.

4. The method of claim 2, wherein the designated aspect used for matching comprises a destination MAC address of the packet.

5. The method of claim 2, wherein the designated aspect used for matching comprises both a source MAC address and a destination MAC address of the packet, and wherein the match is found if either matches.

6. The method of claim 2, wherein the designated aspect used for matching comprises both a source MAC address and a destination MAC address of the packet, and wherein the match is found if both matches.

7. The method of claim 1, wherein the LUT comprises an Internet protocol (IP) address table.

8. The method of claim 7, wherein the designated aspect used for matching comprises a source IP address.

9. The method of claim 7, wherein the designated aspect used for matching comprises a destination IP address of the packet.

10. The method of claim 7, wherein the designated aspect used for matching comprises both a source IP address and a destination IP address of the packet, and wherein the match is found if either matches.

11. The method of claim 7, wherein the designated aspect used for matching comprises both a source IP address and a destination IP address of the packet, and wherein the match is found if both matches.

12. The method of claim 1, wherein the LUT comprises a subnet table.

13. The method of claim 12, wherein the designated aspect used for matching comprises a destination IP address, and wherein a match is found if the destination address is within a flagged subnet in the subnet table.

14. The method of claim 12, wherein the designated aspect used for matching comprises a source IP address, and wherein a match is found if the source address is within a flagged subnet in the subnet table.

15. The method of claim 12, wherein the designated aspect used for matching comprises both a source IP address and a destination IP address, and wherein a match is found if either of the addresses are within a flagged subnet in the subnet table.

16. The method of claim 12, wherein the designated aspect used for matching comprises both a source IP address and a destination IP address, and wherein a match is found if both of the addresses are within a flagged subnet in the subnet table.

17. The method of claim 1, wherein the LUT comprises an access control list (ACL).

18. The method of claim 17, wherein the designated aspect comprises a filter element.

19. The method of claim 1, wherein the determination of a match is accomplished by way of a linear search.

20. The method of claim 1, wherein the determination of a match is accomplished by using a hash table.

21. The method of claim 1, wherein the determination of a match is accomplished utilizing a b-tree searching algorithm.

22. The method of claim 1, wherein the look-up table is stored in content addressable memory.

23. The method of claim 1, wherein the determination of a match is accomplished using a search process that stops when a first match to the designated aspect is found, irregardless of whether the entry found is flagged for mirroring.

24. A networking apparatus, the apparatus comprising:
   an operating system including routines utilized to control the apparatus;
   a look-up table including selection information for mirror sources therein; and
   a mirroring engine for forwarding copies of selected packets to at least one corresponding mirror destination, wherein a packet is mirrored if a designated aspect of the packet matches a flagged entry in the look-up table.

25. The apparatus of claim 24, wherein multiple mirror sources correspond to the mirror destination(s).

26. The apparatus of claim 24, wherein the apparatus supports multiple mirror sessions, wherein each mirror session comprises at least one mirror source and at least one corresponding mirror destination.

27. The apparatus of claim 24, wherein the look-up table comprises a MAC address table.

28. The apparatus of claim 24, wherein the look-up table comprises an IP address table.

29. The apparatus of claim 24, wherein the look-up table comprises a subnet table.

30. The apparatus of claim 24, wherein the look-up table comprises an access control list.

31. A method of selecting packets to mirror from network traffic, the method comprising:
   receiving a data packet by a network device;

determining whether characteristics of the packet matches static mirroring criteria from a look-up table on the network device;

checking state information relating to the network traffic against dynamic mirroring criteria; and sending a copy of the packet to an associated mirror destination if the characteristics of the packet matches the static mirroring criteria and if the state information matches the dynamic mirroring criteria.

32. The method of claim 31, wherein the state information comprises a number of packets so far matching the static mirroring criteria, and wherein at least one counter is used to maintain the state information.

33. The method of claim 31, wherein the state information comprises a time between mirrored packets.

34. The method of claim 31, wherein the state information comprises whether a valid TCP connection has been formed.

35. The method of claim 31, wherein the state information comprises whether an allocated bandwidth has been used up.

* * * * *

UNITED STATES PATENT AND TRADEMARK OFFICE
CERTIFICATE OF CORRECTION

PATENT NO. : 7,292,573 B2
APPLICATION NO. : 10/813766
DATED : November 6, 2007
INVENTOR(S) : Bruce Edward LaVigne et al.

Page 1 of 1

It is certified that error appears in the above-identified patent and that said Letters Patent is hereby corrected as shown below:

On the title page, in drawing, under "ports 1004" delete "#10" and insert -- #7 --, therefor.

On sheet 15 of 15, Fig. 10, under "ports 1004" delete "#10" and insert -- #7 --, therefor.

Signed and Sealed this

Twenty-second Day of December, 2009

David J. Kappos
*Director of the United States Patent and Trademark Office*